Oct. 15, 1963  L. H. BROOKS  3,107,148
RECOVERY OF HYDROGEN FLUORIDE FROM ITS AZEOTROPE WITH WATER
Filed Nov. 14, 1960
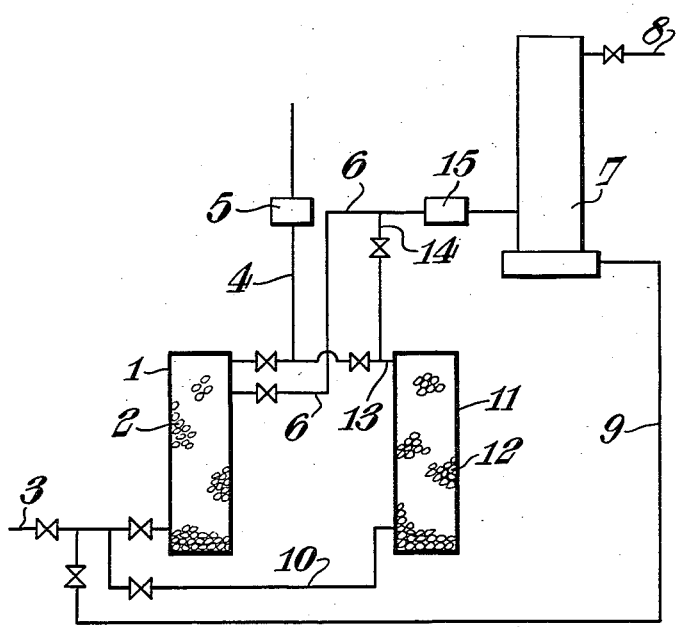

2,107,148
Patented Oct. 15, 1963

3,107,148
RECOVERY OF HYDROGEN FLUORIDE FROM ITS AZEOTROPE WITH WATER
Lionel Hepworth Brooks, Wrea Green, Preston, England, assignor to United Kingdom Atomic Energy Authority, London, England
Filed Nov. 14, 1960, Ser. No. 69,176
10 Claims. (Cl. 23—153)

This invention relates to the recovery of hydrogen fluoride and it provides for the recovery of hydrogen fluoride from its azeotrope with water.

When a solution of hydrogen fluoride in water at a concentration greater than 37% is factionated, anhydrous hydrogen fluoride is produced and the residue is the azeotrope, containing 37% hydrogen fluoride.

One method of recovering hydrogen fluoride from its azeotrope with water is to add a third component which takes up the hydrogen fluoride. Subsequent treatment to regenerate the hydrogen fluoride usually results in the decomposition and loss of the third component. Another method is by electro-dialysis. This method, however, requires elaborate and expensive equipment.

According to the invention a method of recovering hydrogen fluoride from its azeotrope with water comprises the step of contacting a vapour mixture of the composition of the azeotrope with a metallic oxide maintained at a temperature such that the hydrogen fluoride is removed from the mixture by reacting with the metallic oxide to form the metal fluoride whilst the steam in the mixture does not react with the metallic oxide, and the subsequent step of raising the temperature of the metal fluoride so formed and contacting it with steam to cause liberation of hydrogen fluoride and regeneration of the metallic oxide.

The method may be operated in continuous manner by passing the vapour mixture over the metallic oxide at the lower temperature, and repassing the separated steam, or alternatively passing more vapour mixture over the metal fluoride at the higher temperature.

By way of example, the invention will now be described with reference to the accompanying drawings, the single figure of which is a line diagram.

The single figure of the drawings show a tower 1, containing a bed of ferric oxide 2, having a valved inlet pipe 3 and a valved outlet pipe 4. The pipe 4 has a monitor 5 and the tower 1 has a valved outlet pipe 6 having a monitor 15 and connecting to a fractionation column 7. The column 7 has a valved outlet pipe 8 and a valved pipe 9 connecting to the pipe 3. The pipe 3 has a branch valved pipe 10 connecting to a tower 11 containing a bed of ferric oxide 12. The tower 11 has a valved outlet pipe 13 connecting to the pipe 4 and the pipe 13 has a branch valved pipe 14 connecting to the pipe 6. The towers 1, 11 are each fitted with heating and cooling systems.

The apparatus described above with reference to the drawings is designed for use for the recovery of hydrogen fluoride from its azeotrope with water by the method according to the invention and is constructed generally of a material resistant to hydrogen fluoride, such as, for example, nickel.

The recovery process is based on the following equation:

$$Fe_2O_3 + 6HF \rightleftharpoons 2FeF_3 + 3H_2O$$

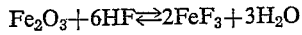

In operation, a vapour mixture of the composition of the azeotrope is first passed via the pipe 3 into the tower 1 and through the bed of ferric oxide 2 which is maintained at a temperature of 170° C. The mixture contacts the ferric oxide and the hydrogen fluoride in the mixture reacts with the ferric oxide to form ferric fluoride and the resultant steam and steam from the mixture passes out through the outlet pipe 4 to waste. Under these conditions the outgoing steam contains approximately 1% hydrogen fluoride, the hydrogen fluoride content being monitored by the monitor 5. As soon as the hydrogen fluoride content of the outgoing steam rises significantly above 1% (indicating that all the ferric oxide 2 is converted to ferric fluoride), the temperature of the ferric fluoride in the tower 1 is raised to 550° C. and at the same time the mixture is allowed to flow via the pipe 10 into the tower 11 in which the ferric oxide 12 is maintained at 170° C. The reaction taking place in tower 11 is as described above for tower 1, the outgoing steam passing to the pipe 4 via the pipe 13. In tower 1, steam in the mixture passing through and contacting the bed of ferric fluoride reacts to liberate hydrogen fluoride and regenerate ferric oxide, the liberated hydrogen fluoride mixing with the hydrogen fluoride from the mixture to flow out through the pipe 6. Under these conditions the outflowing hydrogen fluoride contains approximately 7% of water, the water content being monitored by the monitor 15. The hydrogen fluoride passes to the column 7 and is fractionated to yield anhydrous hydrogen fluoride at the outlet pipe 8 and a residue of azeotrope which returns outlet pipe 8 and a residue of azeotrope which returns to the pipe 3 via the pipe 9. The flow rates of mixture to the towers 1, 11 are adjusted so that the reactions in the towers are completed at the same time, as indicated by rising hydrogen fluoride at monitor 5 and rising steam content at monitor 15, when the temperatures of the towers 1, 11 are reversed, tower 1 now being at 170° C. and tower 11 at 550° C. Steam from tower 1 now goes to waste and hydrogen fluoride from tower 11 to the column 7 via pipes 14 and 6. In this way a continuous cyclic process is achieved.

Whilst ferric oxide is the preferred oxide to use, other metallic oxides can be used such as, for example, cupric oxide, chromic oxide and nickel oxide (NiO) provided the tower temperatures are suitably adjusted. Thus for cupric oxide suitable tower temperatures are 160° C. and 550° C., for chromic oxide 350° C. and 650° C., and for nickel oxide (NiO) 350° C. and 800° C.

I claim:
1. A method of recovering hydrogen fluoride from its azeotrope with water comprising passing a mixture of the composition of the azeotrope in a vapor state through a bed of metal oxide reactable with hydrogen fluoride, with said bed being maintained at a temperature sufficient to convert substantially all of said metal oxide into the corresponding metal fluoride, elevating the temperature of said bed at the completion of the conversion thereof to a point at which said metal fluoride, when contacted with steam, will liberate hydrogen fluoride, passing steam through said bed to convert substantially all of said metal fluoride into metal oxide and hydrogen fluoride, and recovering said hydrogen fluoride.

2. A method of recovering hydrogen fluoride from the azeotrope with water comprising alternately passing a mixture of the composition of the azeotrope in a vapor state through a first bed of metal oxide reactable with hydrogen fluoride, and a second bed of metal oxide reactable with hydrogen fluoride, each of said metal oxide beds being an oxide selected from the group consisting of ferric oxide, chromic oxide, cupric oxide, and nickel oxide, each of said first and second beds being maintained, when said mixture is passed therethrough, at a temperature sufficient to convert substantially all of said metal oxide into the corresponding metal fluoride, alternately elevating the temperature of said first and second beds at the completion of the conversion of the metal oxide thereof to a point at which said metal fluoride, when contacted with steam, will liberate hydrogen fluoride, alternately passing steam through each of said first and second beds to convert substantially all of said metal fluoride into hydrogen fluoride and metal oxide, and alternately recovering hydrogen fluoride from each of said first and second beds.

3. A process in accordance with claim 2, wherein the flow rates of the mixture in vapor form and steam to the first and second beds in alternate relationship are adjusted so that the respective conversions in each bed are completed at substantially the same time.

4. A method of recovering hydrogen fluoride from its azeotrope with water comprising passing the azeotrope in a vapor state through a bed of metal oxide reactable with hydrogen fluoride, said bed being maintained at a temperature sufficient for conversion of metal oxide into the corresponding metal fluoride in said bed with evolution of steam, elevating the temperature of said bed, passing steam through said bed, said bed being maintained at a temperature sufficient for conversion of metal fluoride into the corresponding metal oxide in said bed with evolution of hydrogen fluoride, and recovering said hydrogen fluoride.

5. A method of recovering hydrogen fluoride from its azeotrope with water comprising passing the azeotrope in a vapor state through a bed of metal oxide reactable with hydrogen fluoride, said metal oxide being an oxide selected from the group consisting of ferric oxide, chromic oxide, cupric oxide, and nickel oxide, said bed being maintained at a temperature sufficient for conversion of metal oxide into the corresponding metal fluoride in said bed with evolution of steam and depletion of the hydrogen fluoride content of the azeotrope, elevating the temperature of said bed, passing further azeotrope in a vapor state through the bed, said bed being maintained at a temperature sufficient for conversion of metal fluoride into the corresponding metal oxide in said bed with evolution of hydrogen fluoride and enrichment of the hydrogen fluoride content of the azeotrope, and recovering hydrogen fluoride from said enriched azeotrope.

6. A method of recovering hydrogen fluoride from its azeotrope with water as claimed in claim 5 wherein the enriched azeotrope is fractionated to produce anhydrous hydrogen fluoride and a residue of vapor of the composition of the azeotrope, and recycling said residue for recovery of hydrogen fluoride in the residue.

7. A method of recovering hydrogen fluoride from its azeotrope with water comprising passing a mixture of the composition of the azeotrope in a vapor state through a bed of metal oxide reactable with hydrogen fluoride, said metal oxide being an oxide selected from the group consisting of ferric oxide, chromic oxide, cupric oxide and nickel oxide and said bed being maintained at a temperature sufficient to convert substantially all of said metal oxide into the corresponding metal fluoride, elevating the temperature of said bed at the completion of the conversion thereof to a point at which said metal fluoride, when contacted with steam, will liberate hydrogen fluoride, passing steam through said bed to convert substantially all of said metal fluoride into metal oxide and hydrogen fluoride, and recovering said hydrogen fluoride.

8. A process in accordance with claim 7, wherein the hydrogen fluoride recovered is fractionated to produce anhydrous hydrogen fluoride and residue of vapor of the composition of the azeotrope, and recycling said residue for admixture with the mixture to be converted.

9. A method of recovering hydrogen fluoride from its azeotrope with water comprising passing a mixture of the composition of the azeotrope in a vapor state through a bed of metal oxide reactable with hydrogen fluoride, said metal oxide being an oxide selected from the group consisting of ferric oxide, chromic oxide, cupric oxide and nickel oxide and said bed being maintained at a temperature sufficient for conversion of metal oxide into the corresponding metal fluoride in said bed with evolution of steam, elevating the temperature of said bed, passing steam through said bed, said bed being maintained at a temperature sufficient for conversion of metal fluoride into the corresponding metal oxide in said bed with evolution of hydrogen fluoride, and recovering said hydrogen fluoride.

10. A method of recovering hydrogen fluoride from its azeotrope with water as claimed in claim 5, wherein the azeotrope is passed continuously through two metal oxide beds, the temperature of each bed being alternately lowered for depletion of the hydrogen fluoride content of the azeotrope and raised for enrichment of the hydrogen fluoride content of the azeotrope, and wherein the temperature changes of each bed are adjusted so that while one bed yields depleted azeotrope the other bed yields enriched azeotrope with the result that enriched azeotrope is yielded continuously.

References Cited in the file of this patent

UNITED STATES PATENTS 1,293,703    Catlin _____ Feb. 11, 1919

OTHER REFERENCES

J. W. Mellor's, "A Comprehensive Treatise on Inorganic and Theoretical Chemistry," vol. 2, 1922 ed., page 133. Longmans, Green and Co., N.Y.